UNITED STATES PATENT OFFICE.

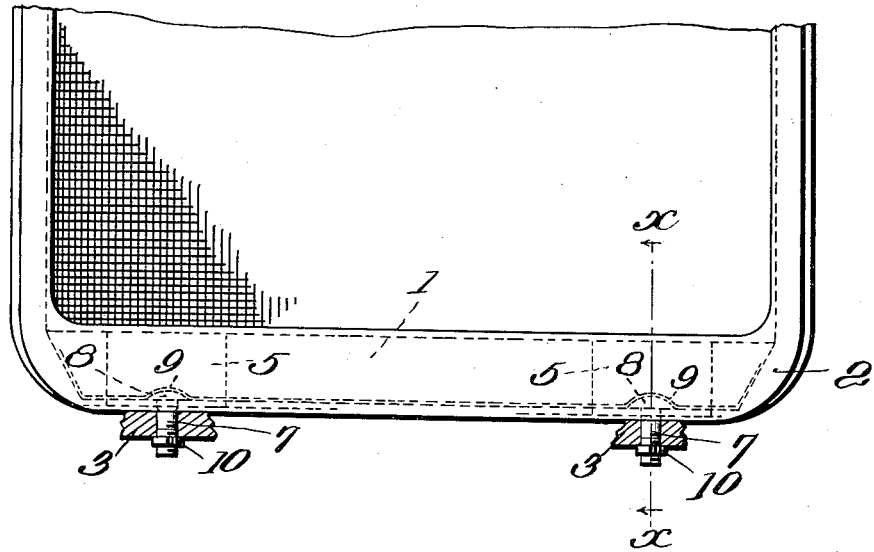
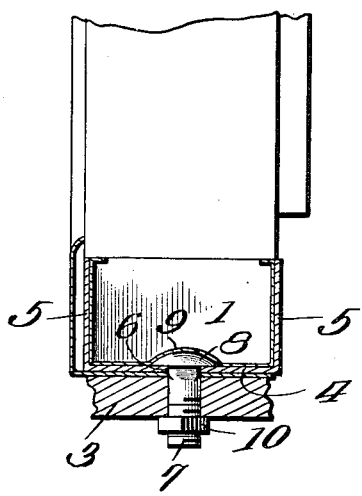
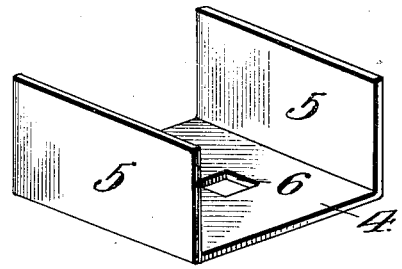

CLYDE MARTIN ANDERSON, OF JAMESTOWN, NEW YORK, ASSIGNOR TO JAMESTOWN CAR PARTS MANUFACTURING COMPANY, INC., OF JAMESTOWN, NEW YORK, A CORPORATION OF NEW YORK.

AUTOMOBILE-RADIATOR-ATTACHING DEVICE.

1,283,615. Specification of Letters Patent. Patented Nov. 5, 1918.

Application filed June 8, 1917. Serial No. 173,556.

*To all whom it may concern:*

Be it known that I, CLYDE M. ANDERSON, a citizen of the United States, residing at Jamestown, in the county of Chautauqua, State of New York, have invented certain new and useful Improvements in Automobile-Radiator-Attaching Devices, of which the following is a description, reference being had to the accompanying drawing and to the figures of reference marked thereon.

The invention relates to new and useful improvements in automobile radiator attaching devices, and more particularly to the devices which are secured to the radiator and adapted to extend through the supporting frame for firmly clamping the radiator in place on the supporting frame.

An object of the invention is to provide an attaching device of the above character which may be readily secured to the radiator of the automobile without perforating the metal parts of the radiator.

A further object of the invention is to provide a metal plate which may be readily shaped to the tank at the lower end of the radiator and secured thereto in any suitable way, which metal plate is formed with an opening to receive the securing stud, said opening being shaped to prevent the stud from turning, and wherein the lower plate or metal parts of the tank are shaped so as to form a recess or pocket for the head of the securing stud.

These and other objects will in part be obvious and will in part be hereinafter more fully disclosed.

In the drawings, which show by way of illustration one embodiment of the invention, Figure 1 is a front view of a portion of an automobile radiator having my improved securing devices attached thereto.

Fig. 2 is a sectional view on the line *x—x* of Fig. 1.

Fig. 3 is a perspective view of one of the securing channel plates.

The invention consists broadly in providing a metal plate which is attached to the outer wall of the tank at the lower end of the radiator of the automobile either by spot welding, or by soldering, or the like. This metal plate has a hole extending therethrough centrally underneath the tank, which is adapted to receive the shank of the holding stud or bolt for securing the radiator to the supporting frame. This hole is irregular in outline, so that the shank, which is similarly shaped, will not turn in the hole.

The bottom wall of the tank of the radiator is formed with a blister or recess to receive the head of the securing stud. It will thus be seen that the stud is secured to the plate and held from turning therein, and the plate is secured in turn to the radiator, and thus forms a means for securing the stud to the radiator.

Referring more in detail to the drawings, I have shown more or less diagrammatically a section of the radiator which consists of a lower tank 1, to which is attached the ordinary honey-comb radiator proper, and extending about this tank is a containing frame 2. For securing this radiator to the supporting frame indicated at 3 in Fig. 2 of the drawings, I have provided the following improved attaching devices:—

I utilize a channel plate 4 which is of metal, which channel plate has sides or legs 5, 5, and an opening 6 formed centrally of the main portion of the channel plate. This opening is rectangular in shape. The channel plate is proportioned so that the main portion thereof extends across the bottom of the tank, which is clearly shown in Fig. 2 of the drawings, and the legs or side portions 5, 5 extend up the sides of the tank preferably the full height thereof. Extending through the opening or hole 6 is a securing stud 7. This securing stud has a rectangular section at the upper end of its shank fitting the rectangular hole so that when the stud is in place it cannot turn in the plate. The securing stud is formed with a head 8, the upper face of which is spherical.

The lower wall of the tank 1 is bent upward to form a blister or recess, indicated at 9, which is shaped to conform to the head 8 of the stud 7. The stud is inserted through the opening in the channel plate, after which the channel plate is placed about the tank, and is then secured thereto by spot welding or soldering. As shown in the drawings, the tank 1 is provided with two of these securing studs, and the studs extend down through the frame 3, and a locking nut 10 is turned onto the stud to hold the radiator in place on the frame.

The channel being bent out of metal, it may be made the correct size to fit the outside of the tank.

From the above description, it will be apparent that I have provided a very simple attaching means for securing the radiator to the supporting frame. This attaching means is very simple in construction, and may be cheaply made, and may be attached to the radiator without forming any holes through the tank, which are liable to cause leaks, and when once secured in place the securing stud in effect becomes a permanent part of the channel plate, which serves as a very strong and extensive securing means, so that the strain on the stud is distributed over a large area of the radiator, and there is no liability of the radiator being torn loose from its securing means.

It is obvious that minor changes in the details of construction may be made without departing from the spirit of the invention as set forth in the appended claim.

What I claim as new is:—

In combination with a radiator tank for automobiles and a supporting frame, of means for securing the radiator tank to the frame, including a channel plate located outside of the tank and shaped to fit across the bottom and up the sides of the tank, said channel plate having an opening disposed centrally of the portion thereof extending across the bottom of the tank, said opening being irregular in contour, a headed securing stud having a shank fitting said irregularly shaped opening, the head of said stud lying between said channel plate and the bottom of the tank, and the bottom of said tank being bent to form a recess for the head of the securing stud, said channel plate being soldered to the tank.

In testimony whereof I affix my signature in the presence of two witnesses.

CLYDE MARTIN ANDERSON.

Witnesses:
GUSTAF A. LAWSON,
ALBERT C. NORDSTROM.